US010923092B1

(12) United States Patent
Hoh et al.

(10) Patent No.: US 10,923,092 B1
(45) Date of Patent: Feb. 16, 2021

(54) APPARATUS FOR PLAYING A MULTI-STRING INSTRUMENT

(71) Applicant: OB-session Enterprises, Inc., Selma, NC (US)

(72) Inventors: Raymond Karl Hoh, Selma, NC (US); Debra Kay Hoh, Selma, NC (US)

(73) Assignee: OB-session Enterprises, Inc., Selma, NC (US)

( * ) Notice: Subject to any disclaimer, the term of this patent is extended or adjusted under 35 U.S.C. 154(b) by 0 days.

(21) Appl. No.: 17/003,676

(22) Filed: Aug. 26, 2020

(51) Int. Cl.
*G10H 3/18* (2006.01)
*G06F 3/0354* (2013.01)
*G09B 15/06* (2006.01)

(52) U.S. Cl.
CPC ........... *G10H 3/18* (2013.01); *G06F 3/03547* (2013.01); *G09B 15/06* (2013.01); *G10H 2220/096* (2013.01); *G10H 2230/075* (2013.01); *G10H 2240/171* (2013.01)

(58) Field of Classification Search
CPC .... G10H 1/348; G10H 2230/145; G10H 1/00; G10H 3/18; G10H 2220/275; G10H 1/32; G10H 2220/005; G10H 2220/096; G10H 2210/195; G10H 2220/165; G10D 1/085; G10D 3/06; G10D 1/08; G10D 3/10; G10D 3/147; G10F 1/20
See application file for complete search history.

(56) References Cited

U.S. PATENT DOCUMENTS

| 4,249,450 | A | 2/1981 | Quemore, Sr. |
| 6,753,466 | B1 * | 6/2004 | Lee ........................... G10D 3/00 84/470 R |
| 9,424,818 | B1 * | 8/2016 | Spangler ................... G10D 1/08 |
| 10,497,349 | B1 * | 12/2019 | Boxberger ............... G10D 3/04 |
| 2006/0243123 | A1 * | 11/2006 | Ierymenko ............. G10H 3/125 84/742 |
| 2011/0283868 | A1 * | 11/2011 | Behringer ............ G10H 1/0008 84/622 |
| 2013/0174717 | A1 * | 7/2013 | Butera ................... G10H 1/342 84/609 |
| 2016/0163298 | A1 * | 6/2016 | Butera ................. G10H 1/0066 84/615 |
| 2018/0053494 | A1 * | 2/2018 | Pagliere ................. G10H 3/125 |
| 2019/0244593 | A1 * | 8/2019 | Starr ..................... G10H 1/0008 |
| 2020/0273439 | A1 * | 8/2020 | Starr ..................... G10H 1/342 |

FOREIGN PATENT DOCUMENTS

CA              318805 A      1/1932

* cited by examiner

*Primary Examiner* — Marlon T Fletcher
(74) *Attorney, Agent, or Firm* — James G. Passé; Passé Intellectual Property, LLC

(57) ABSTRACT

A system for playing a multi-string instrument utilizing a device in conjunction with hardware and software that once programmed on a computer using a touchscreen, solenoids press the strings down on the frets on the neck of a multi-string instrument, requiring a user to only need to touch the touchscreen and simultaneously strum the strings by any method.

6 Claims, 5 Drawing Sheets

APPARATUS FOR PLAYING A MULTI-STRING INSTRUMENT

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a system for playing a multi-string instrument. In particular, it relates to an apparatus attached to a multi-string instrument that presses the strings down between the frets requiring a user to only need to strum the strings and simultaneously select chords or notes on a touchscreen with a single digit, stylus, mouthpiece, or other suitable prosthetic or device.

Description of Related Art

Multi-string musical instruments such as guitars, bass guitars, ukuleles (either electric or acoustic), and banjos typically have between 4 and 6 strings that are strung along a neck wherein there are frets on the neck that correspond to musical notes in addition to the open string notes. These instruments are usually played by having one hand press down on strings between frets on the neck of the multi-string instrument to create a chord or individual notes, while a device or the opposite hand strums or pics the strings. This becomes difficult to impossible for people with access to no hands, only one hand, or for those that do not want to fret the strings.

While there have been attempts to create devices for use of only one hand on these musical instruments, they all suffer from similar problems and it is clear there needs to be a better system allowing disabled individuals and others to play string instruments with one hand or no hands.

BRIEF SUMMARY OF THE INVENTION

The present invention relates to a system which allows a user to play a multi-string instrument by merely strumming the instrument's strings by any manner, while computer software-controlled solenoids depress each of the strings on the first 4 frets on the neck of the multi-string instrument as necessary to produce single notes or chords while the user strums the strings. The chords and notes are engaged by pressing on a touchscreen which causes necessary solenoids to be engaged. The present invention provides a system which allows the user to play all of the "open" chords (those that are on the first 4 frets of the instrument). It allows any user to bypass years of lessons and practice and provides the ability to play a multi-string instrument immediately.

Accordingly, in one embodiment, there is a system for a user to play a multi-string instrument by strumming the strings and simultaneously touching a touchscreen comprising:
 a) a multi-string instrument having 4 or more frets positioned on a neck of the multi-string instrument;
 b) a plurality of solenoids, one positioned over each string by each of the first 4 frets;
 c) a computer having a CPU and non-transitory computer-readable medium in a random-access memory (RAM);
 d) software in the RAM which identifies chords and notes corresponding to the plurality of solenoids, and allows a user of the software to select a series of chords and notes in a selected order on a touchscreen;
 e) a touchscreen for selecting the series of chords and notes; and
 f) a connection between the computer and the plurality of solenoids, which activates the plurality of solenoids corresponding to the selected chords and notes received from selecting the chords and notes selected on the touchscreen.

DETAILED DESCRIPTION OF THE INVENTION

Figure 1:
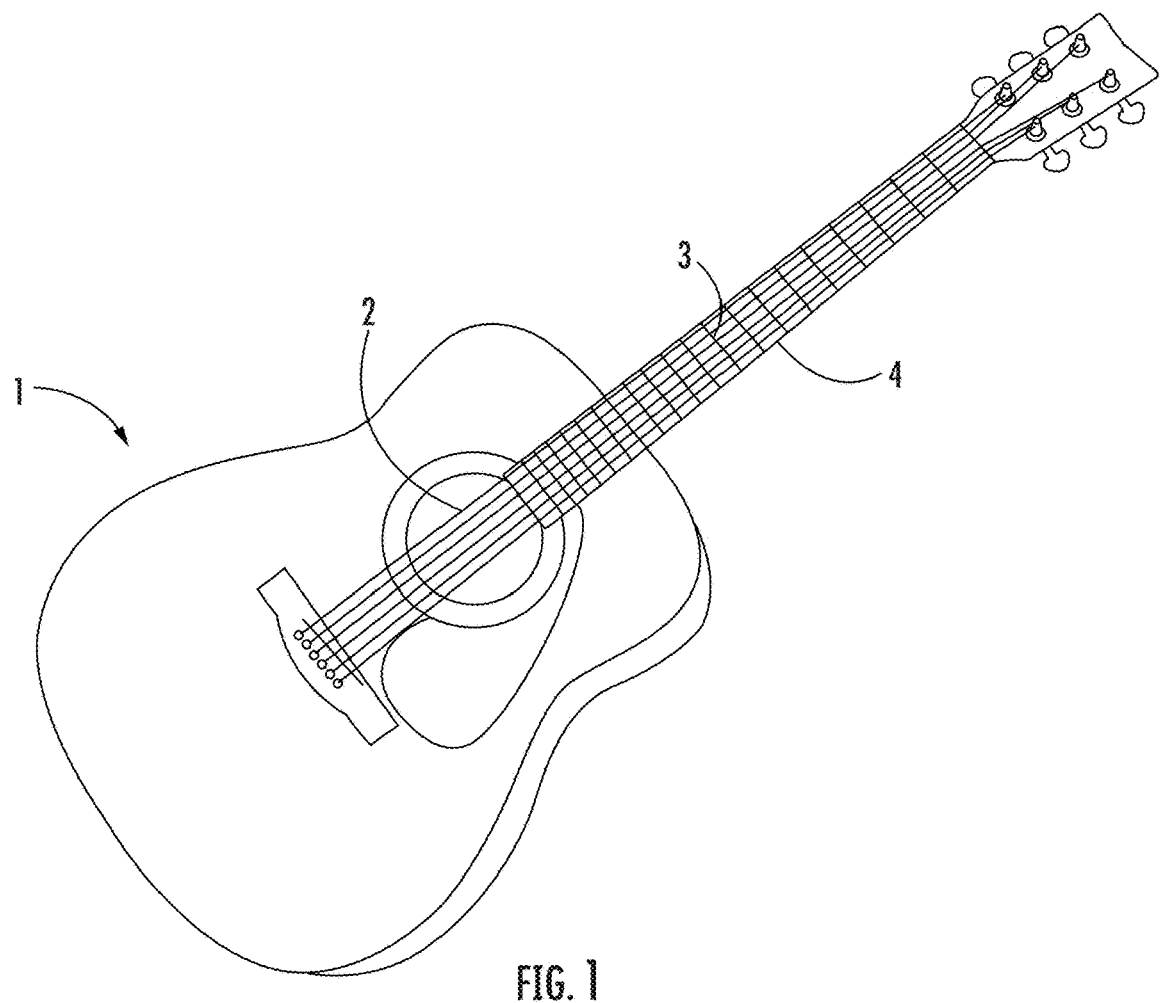
FIG. 1 is a perspective view of an entire 6-string guitar in an embodiment of the present invention.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

As used herein, the term "user" refers to an individual who plays a multi-string instrument and only strums the strings by hand, by a machine, or other device in a manner that causes the strings to vibrate and make a sound to create chords or notes. The person may have no hands, only one hand or may have two hands and only wants to use one hand, not use hands, or use a machine, prosthetics, a mouthpiece, a mechanical strumming machine, and the like. The user will use a touchscreen to select the chords and notes in order and time while simultaneously strumming the strings.

As used herein, the term "multi-string instrument" refers to instruments with 2 or more strings that are strummed or plucked either by single note or by use of chords, usually by way of frets or other placement of fingers along the neck of the instrument. Examples include guitars (6 strings), bass guitars (4 or 5 strings), ukuleles (4 strings), banjos (5 strings), and the like.

As used herein, the term "strumming the strings" refers to any act of picking one or more strings on a multi-string instrument in order to get the resonant tone relating to the note or chord. This includes, but is not limited to, strumming by one hand, two hands, strumming using a device such as a prosthetic, mouthpiece, a machine, and the like.

As used herein, the term "4 or more frets positioned on the neck" refers to one of a series of 4 ridges fixed across the fingerboard of a multi-string musical instrument (such as a guitar). Most chords can be played with just these four ridges by playing open chords.

As used herein, the term "solenoid" refers to a coil of wire, usually in cylindrical form, that when carrying a current acts like a magnet so that a movable core is drawn into and out of the coil when a current flows; and that is used in this case to press down on an individual string just behind one of the frets on the neck of the multi-string instrument to create a note. This is used especially as a switch or control for a mechanical device (such as a valve). It can also refer to a linear actuator which accomplishes the same function.

As used herein, the term "positioned over each string" refers to each solenoid (4 per string corresponding to the 4 frets) being positioned over the strings, such that when the solenoid is engaged, the movable core moves towards the string holding it down as necessary to create the desired note.

As used herein, the term "computer" and related terms (e.g., "computing device"), are not limited to integrated circuits referred to in the art as a computer, but broadly refers to a micro-controller, a microcomputer, a microprocessor, a programmable logic controller (PLC), a phone, a tablet, a laptop, and the like, each having non-transitory, computer-readable medium. In one embodiment, the touchscreen is operating the computer.

As used herein, the term "non-transitory, computer-readable medium" is intended to be representative of any tangible computer-based device implemented in any method or technology for short term and long term storage of information, such as computer-readable instructions, data structures, program modules and submodules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory, computer-readable medium" includes all tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception of being a transitory, propagating signal.

As used herein, the term "each of the 4 frets" refers to the first 4 frets from the top of the neck downward on a multi-string musical instrument.

As used herein, the term "software" refers to computer program instructions (such as imported on a touchscreen) adapted for execution by a hardware element, such as a touchscreen and a processor, wherein the instructions comprise commands that, when executed, cause the processor to perform a corresponding set of commands. The software may be written or coded using a programming language, and stored using any type of non-transitory, computer-readable medium or machine-readable medium well known in the art. Examples of software in the present disclosure comprise any software components, programs, applications, computer programs, application programs, system programs, machine programs, and operating system software.

As used herein, the term "chords and notes" refers to a set of notes played on a multi-string instrument such as a guitar. A chord's notes are often played simultaneously, but they can be played sequentially in an arpeggio. The implementation of chords depends on the tuning. Most guitars used in popular music have six strings with the "standard" tuning of, namely 'E-A-D-G-B-E' (from the lowest pitched string to the highest); in standard tuning, the intervals present among adjacent strings are perfect fourths, except for the major third (G, B). Standard tuning requires four chord-shapes for the major triads.

As used herein, the term "activates" refers to a microprocessor or other computer activating a solenoid to press down on a string in response to presses by the user on the touchscreen. It can be one string or all the strings on the instrument. The guitar would have 24 solenoids, but at most, only one per string is activated. In one embodiment, there is both a microprocessor and a separate independent computer.

DRAWINGS

Now referring to the drawings, FIG. 1 is a perspective view of a 6-string guitar 1 showing the strings 2, the frets 3, along the neck 4.

Figure 2:
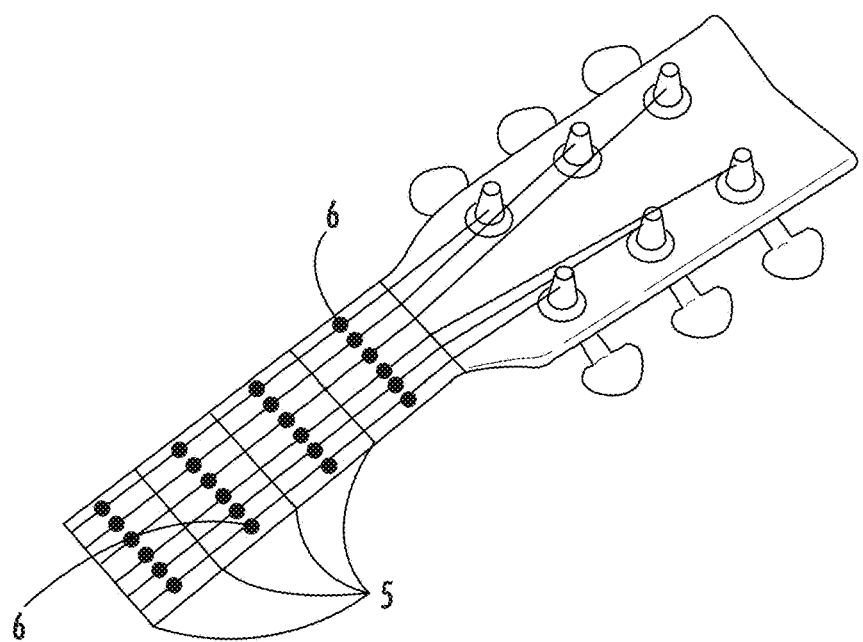
FIG. 2 is a perspective view of a portion (first 4 frets) of a 6-string guitar with solenoids in an embodiment of the present invention.

FIG. 2 is a partial guitar showing the first four frets 5, and the location of the solenoids 6 on each of the strings next to each of the 4 frets 5. Not shown is the connection to the computer/microprocessor.

Figure 3:
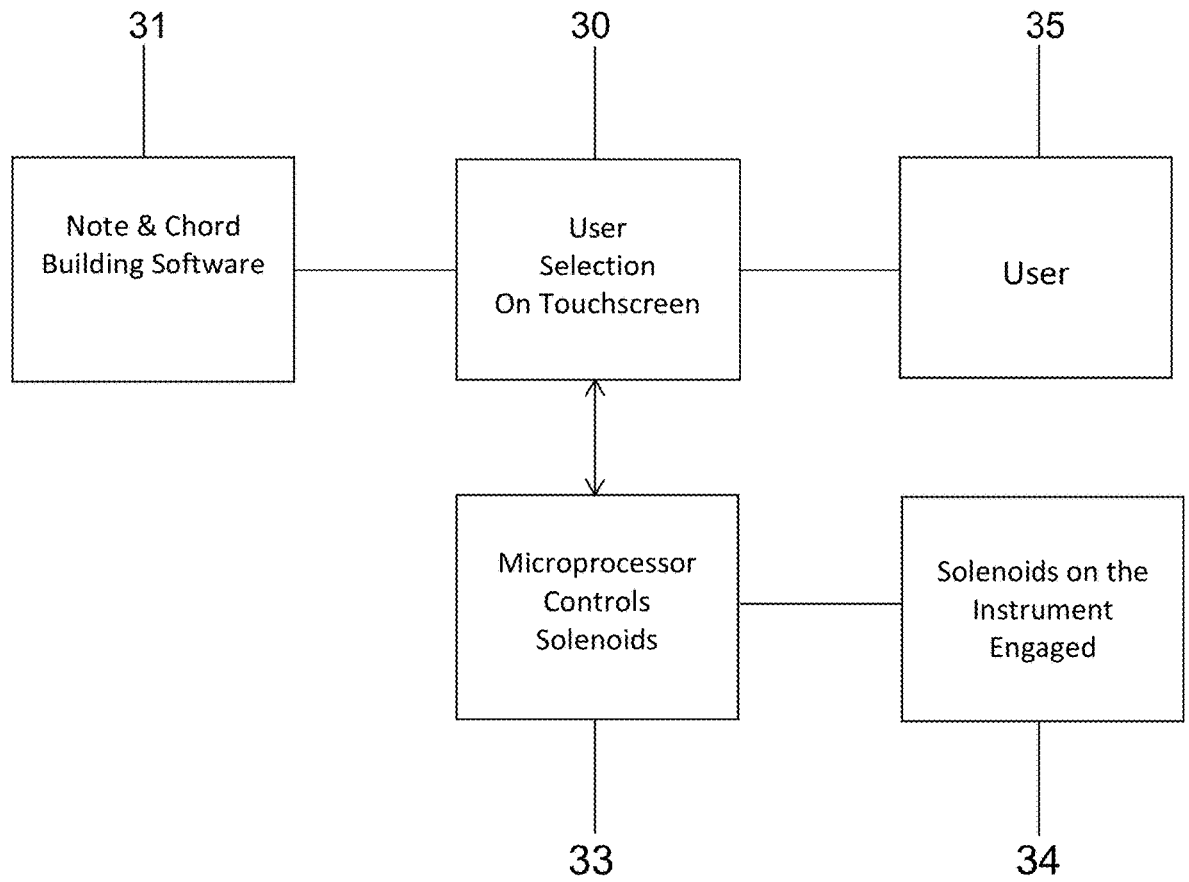
FIG. 3 is a flowchart of the system of the present invention.

FIG. 3 is a diagram of the basic system of the present invention. A user selects 30 one or more notes and/or chords utilizing a note and chord building software 31 on the computer touchscreen. The entry in this embodiment uses a microprocessor with the touchscreen 32, which activates a microprocessor 33 to send signals to one or more solenoids, which are then engaged 34. To play music, the user 35 repeatedly touches the touch screen 32 in the appropriate box and strums the strings by any method simultaneously.

Figure 4:
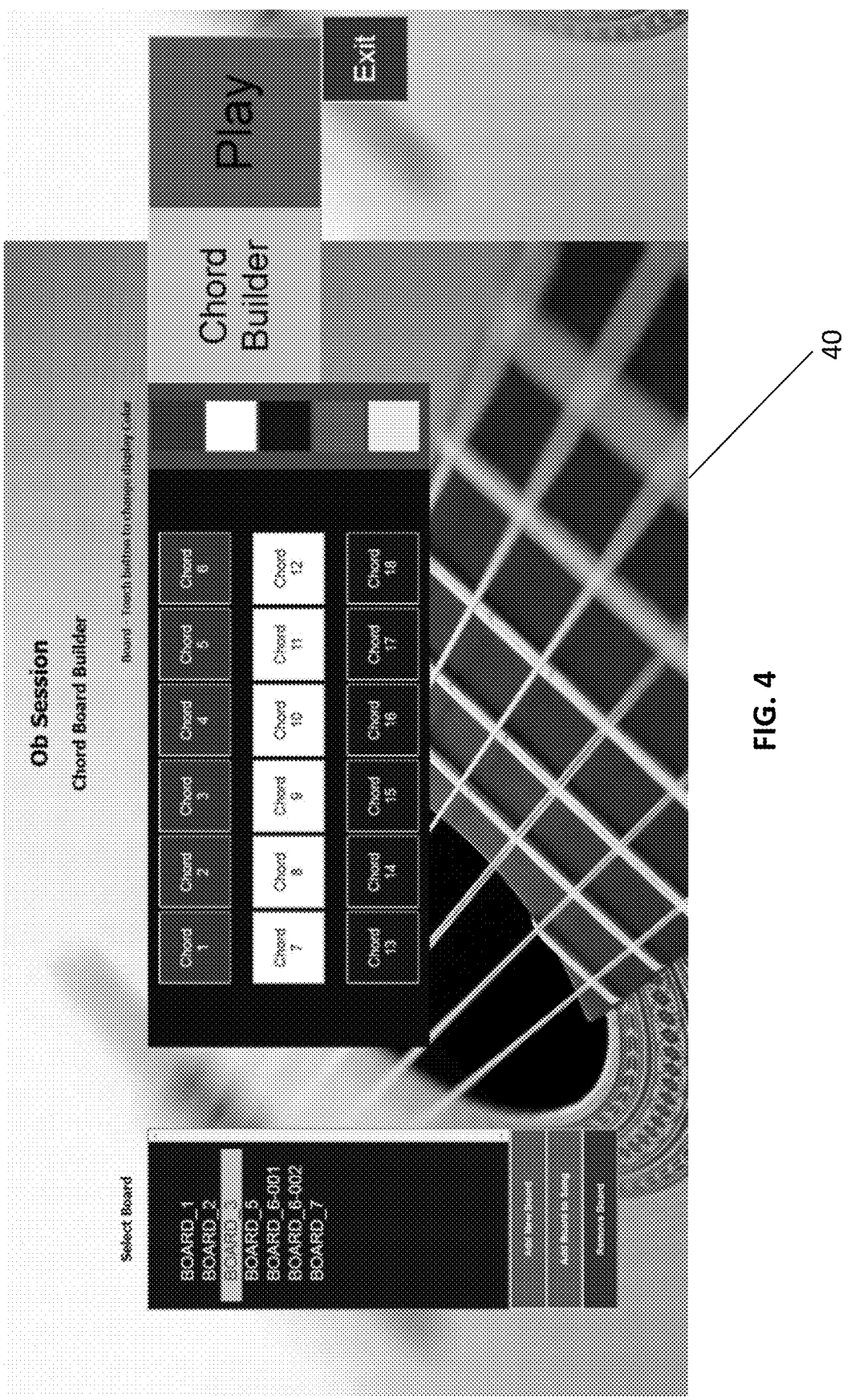
FIG. 4 is a screenshot of a computer GUI showing an example of chord and note creation of the present invention.

FIG. 4 is a screen shot 40 of a touchscreen of the song creation timing which allows the user to modify various song parameters.

Figure 5:
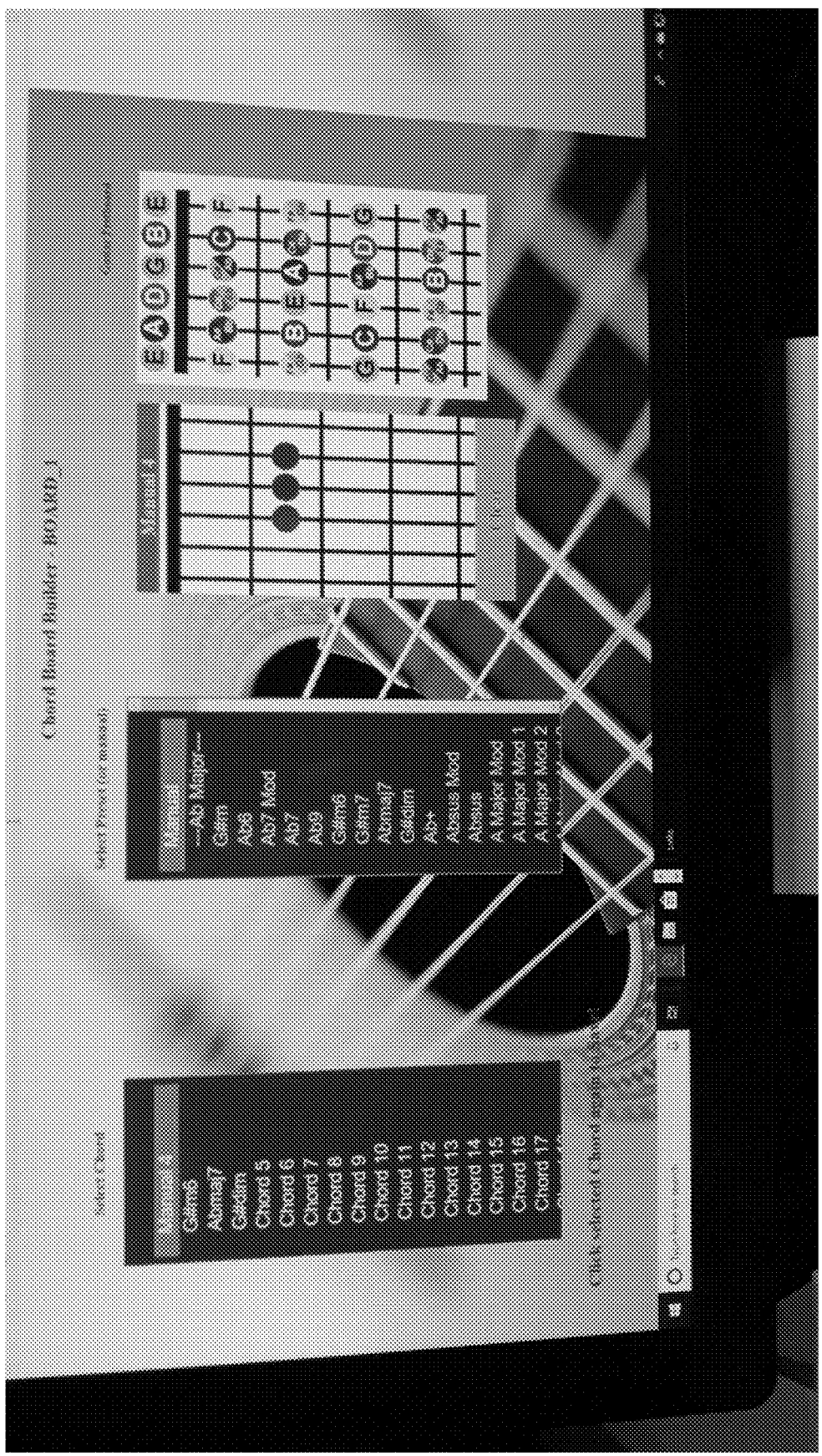
FIG. 5 is a screenshot of a touchscreen GUI showing an example of a song creation and timing screen.

FIG. 5 is a screen shot of a touchscreen of a chord builder program showing the notes corresponding to one or more strings and methods of building the chords available on the first 4 frets.

Figure 6:
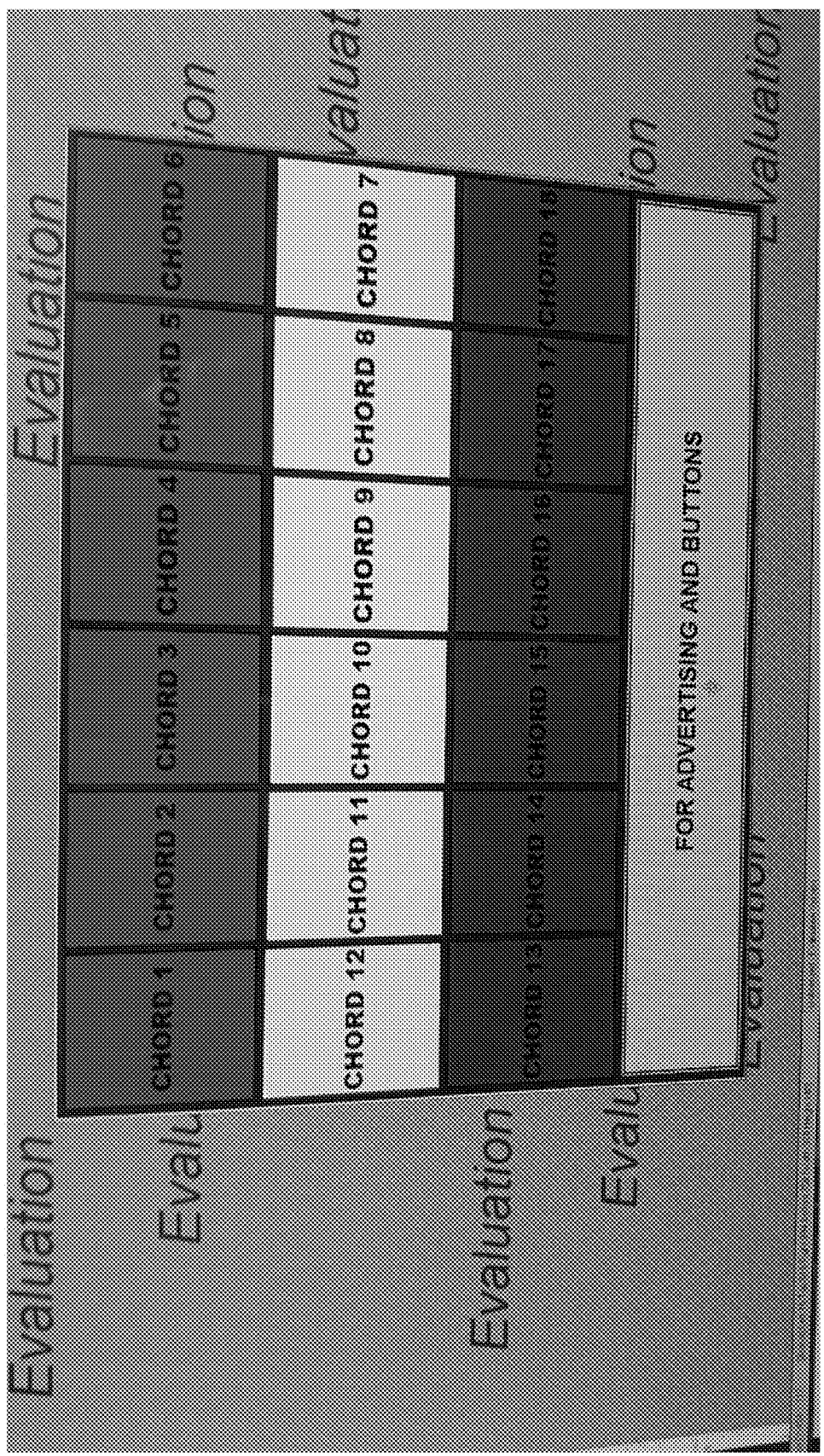
FIG. 6 is a screenshot of a touchscreen GUI for selecting chords and notes on a touch screen in an embodiment of the present invention.

FIG. 6 is a screen shot of the computer screen which shows where an actual song is being played by sequentially touching the appropriate square, while strumming the strings simultaneously. In one embodiment, the song is preprogrammed.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A system for a user to play a multi-string instrument by strumming the strings and simultaneously touching a touchscreen without modifications to the fretboard comprising:

a) a multi-string instrument having 4 or more frets positioned on a neck of the multi-string instrument;
   b) a plurality of solenoids, one positioned over each string by each of the first 4 frets;
   c) a computer, separate from the stringed instrument, having a CPU and non-transitory computer-readable medium, in a random-access memory (RAM);
   d) software in the RAM which identifies chords and notes corresponding to the plurality of solenoids, and allows a user of the software to select a series of chords and notes in a selected order on a touchscreen;
   e) a touchscreen, separate from the stringed instrument, for selecting and playing the series of chords and notes; and
   f) a connection between the computer and the plurality of solenoids, which when the chord is touched on the touchscreen, it activates the plurality of solenoids corresponding to the selected chords and notes received from selecting the chords and notes selected on the touchscreen.

2. The system for a user to play a multi-string instrument by strumming the strings and simultaneously touching a touchscreen according to claim 1, wherein the multi-string instrument is selected from the group consisting of a guitar, a bass guitar, a ukulele, and a banjo.

3. The system for a user to play a multi-string instrument by strumming the strings and simultaneously touching a touchscreen according to claim 1, wherein the multi-string instrument is a six-string guitar and has 24 solenoids.

4. The system for a user to play a multi-string instrument by strumming the strings and simultaneously touching a touchscreen according to claim 1, wherein the computer has a touchscreen.

5. The system for a user to play a multi-string instrument by strumming the strings and simultaneously touching a touchscreen according to claim 1, wherein the user is strumming the strings by using at least one of a hand, a machine, a prosthetic, a mouthpiece, and a mechanical strumming machine.

6. The system for a user to play a multi-string instrument by strumming the strings and simultaneously touching a touchscreen according to claim 1, wherein the computer is a microprocessor with a touchscreen connected to the microprocessor.

\* \* \* \* \*